United States Patent
Chauhan et al.

(10) Patent No.: US 11,584,448 B2
(45) Date of Patent: Feb. 21, 2023

(54) SYSTEMS AND METHODS FOR JOINING A VEHICLE STRUCTURE

(71) Applicant: Rivian IP Holdings, LLC, Plymouth, MI (US)

(72) Inventors: Akshat Chauhan, Livonia, MI (US); Mark Vinnels, Plymouth, MI (US); Vignesh Sekar, Canton, MI (US); Jin Yan, Troy, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 205 days.

(21) Appl. No.: 17/096,454

(22) Filed: Nov. 12, 2020

(65) Prior Publication Data

US 2022/0144348 A1 May 12, 2022

(51) Int. Cl.
  *B62D 27/02* (2006.01)
  *F16B 11/00* (2006.01)
  *B62D 25/02* (2006.01)

(52) U.S. Cl.
  CPC ......... *B62D 27/026* (2013.01); *B62D 25/025* (2013.01); *F16B 11/006* (2013.01)

(58) Field of Classification Search
  CPC .... B62D 27/026; B62D 65/024; B62D 24/02; B62D 24/00; B62D 25/025; F16B 11/006
  USPC ....................................................... 296/35.1
  See application file for complete search history.

(56) References Cited

U.S. PATENT DOCUMENTS

| | | | | |
|---|---|---|---|---|
| 4,978,164 A | * | 12/1990 | Nakamura | B62D 65/04 156/92 |
| 5,964,490 A | * | 10/1999 | Schroeder | B62D 24/00 156/92 |
| 8,672,384 B2 | * | 3/2014 | Fuchs | B62D 65/02 156/291 |
| 9,919,742 B2 | * | 3/2018 | Eppelein | B62D 21/11 |
| 2005/0214096 A1 | * | 9/2005 | Zaluzec | B62D 27/026 411/104 |
| 2016/0251032 A1 | * | 9/2016 | Eppelein | B62D 21/11 296/204 |
| 2019/0144041 A1 | * | 5/2019 | Belpaire | B62D 29/008 296/209 |

(Continued)

FOREIGN PATENT DOCUMENTS

| | | | |
|---|---|---|---|
| EP | 3960589 A1 * | 3/2022 | |
| KR | 20220036654 A1 * | 3/2022 | |
| WO | WO-2016042222 A1 * | 3/2016 | ......... B62D 25/2009 |

*Primary Examiner* — Pinel E Romain
(74) *Attorney, Agent, or Firm* — Haley Guiliano LLP; James A. Leiz; Andrew C. Lee

(57) ABSTRACT

A vehicle includes a body structure having an occupant compartment, and a frame structure having a chassis. The body structure and the frame structure are fastened together using a plurality of fasteners and an adhesive. To illustrate, the plurality of fasteners may include 20, 50, 70, or more fasteners. The adhesive is arranged at one or more positions along the interface between the body structure to the frame structure. The plurality of fasteners extend beyond the wheel wells, and provide hard mounts between the body structure and frame structure. The adhesive helps to prevent stress concentrations by extending the locations of load transfer between the body structure and the frame structure. Body panels are added before or after the body structure is affixed to the frame structure.

18 Claims, 6 Drawing Sheets

(56) References Cited

U.S. PATENT DOCUMENTS

2020/0148292 A1\* 5/2020 Hosbach .............. B62D 65/024
2022/0073143 A1\* 3/2022 Woo .................... B62D 25/025

\* cited by examiner

SYSTEMS AND METHODS FOR JOINING A VEHICLE STRUCTURE

INTRODUCTION

The present disclosure is directed to systems and methods for joining a vehicle structure and more particularly to using fasteners and adhesive to join a body system and frame system.

SUMMARY

In some embodiments, the present disclosure is directed to a vehicle including a body structure, a frame structure, a plurality of fasteners, and an adhesive. The body structure includes an occupant compartment, with or without body panels. The frame system includes a chassis. The plurality of fasteners affix the body structure to the frame structure. To illustrate, the plurality of fasteners at least twenty fasteners, at least fifty fasteners, or more than seventy fasteners. The adhesive is arranged at one or more positions affixing the body structure to the frame structure. In some embodiments, the one or more positions include a path arranged to follow a subset of the plurality of fasteners.

In some embodiments, the plurality of fasteners and the adhesive form a joint mechanically stiffer than either the body structure or the frame structure alone. To illustrate, in some embodiments, the joint is stiffer than compliant couplings such as bushings. In some embodiments, the plurality of fasteners are arranged having a spacing configured to distribute a transfer of load between the body structure and the frame structure.

In some embodiments, a subset of the plurality of fasteners extend longitudinally between wheel wells of the vehicle, and wherein the plurality of fasteners include fasteners that extend outside of strut towers of the vehicle. In some embodiments, a subset of the plurality of fasteners extend longitudinally in front of a front wheel well of the vehicle, and wherein another subset of the plurality of fasteners extend longitudinally behind a rear wheel well of the vehicle.

In some embodiments, the vehicle includes a component affixed to the body structure and the frame structure, using one or more of the adhesive and fasteners, to provide structural support. In some such embodiments, the component includes a plate fastened to an underside of the vehicle to provide lateral stiffness.

In some embodiments, the frame structure includes a battery pack arranged underneath the body structure, a suspension system, and a powertrain system electrically coupled to the battery pack. In some embodiments, the body structure includes a floor pan, one or more door pillars, one or more doors, a hood, a trunk, one or more body panels, or a combination thereof.

In some embodiments, the present disclosure is directed to a method of assembling a vehicle. The method includes providing a body structure having an occupant compartment, providing a frame structure, comprising a chassis, applying a plurality of fasteners to affix the body structure to the frame structure, applying an adhesive along a path affixing the body structure to the frame structure; and arranging the body structure against the frame structure to form a mechanical joint. In some embodiments, the plurality of fasteners includes at least twenty fasteners, at least fifty fasteners, or at least seventy fasteners.

In some embodiments, the method includes affixing a component to the body structure and the frame structure, using one or more of the adhesive and fasteners, to provide structural support. In some such embodiments, the component includes a plate, and affixing the plate includes fastening the plate to an underside of the vehicle to provide lateral stiffness.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is direct to techniques for assembling vehicles. For example, while some vehicles include frames and bodies that are isolated (e.g., via bushings or other non-stiff members or damping members) and do not contribute to each other's performance requirements, the present disclosure is directed to joined frame-body systems. In some embodiments, the present disclosure is direct to a unitized body structure system that allows for the flexibility of a separate frame system but also helps achieve an integrated, continuous assembly having the benefits of a unibody or a monocoque architecture.

Figure 1:
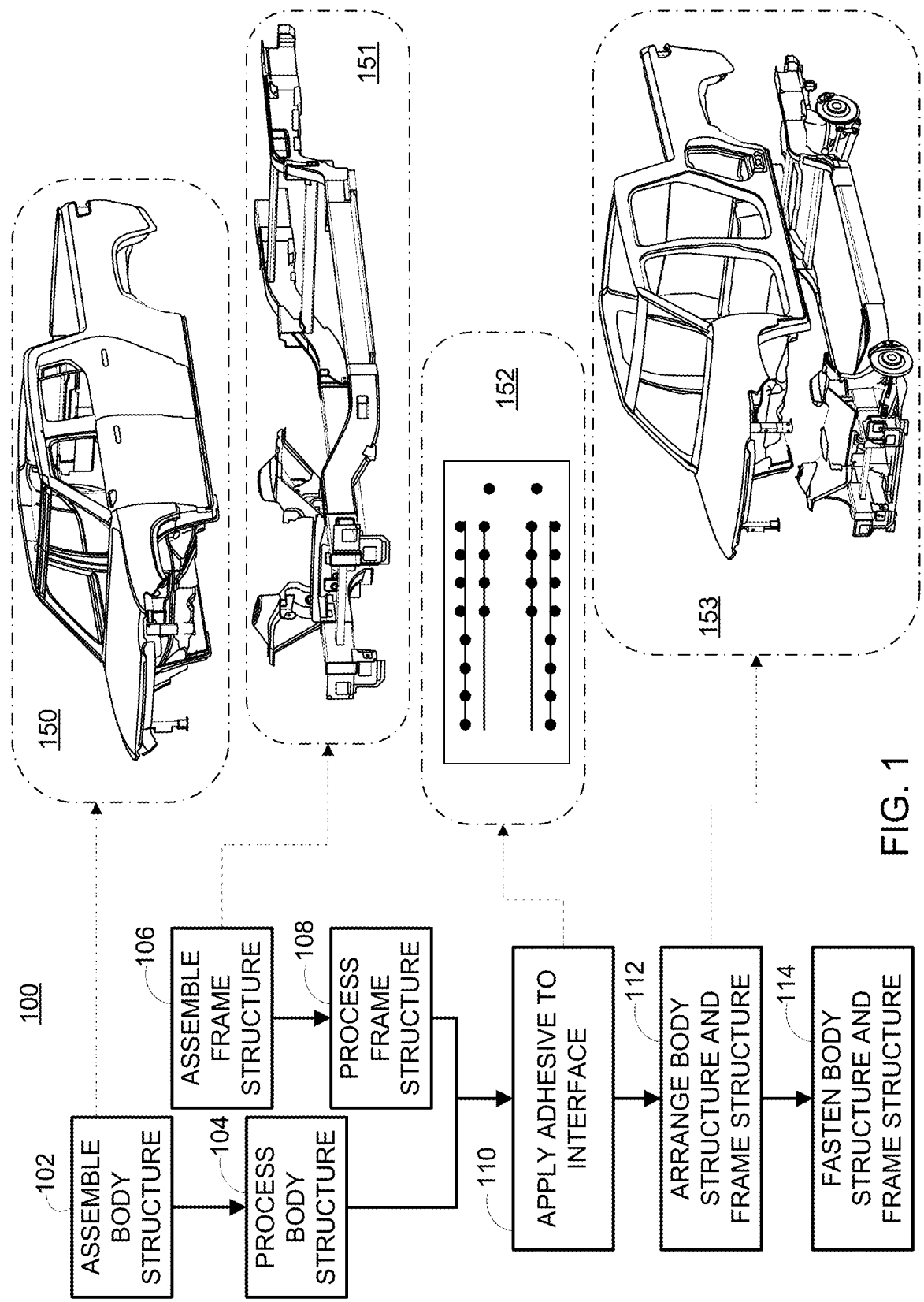
FIG. 1 shows a flowchart of an illustrative process for assembling a vehicle, in accordance with some embodiments of the present disclosure.

FIG. 1 shows a flowchart of illustrative process 100 for assembling a vehicle, in accordance with some embodiments of the present disclosure. Panels 150-153 illustrate some aspects of process 100. To illustrate, process 100 may be used to assemble an electric vehicle, wherein a body structure is affixed to a frame system that includes batteries and a drivetrain.

Step 102 includes assembling a body structure. To illustrate, panel 150 shows an illustrative body structure (or "body system"), in accordance with some embodiments of the present disclosure. A body structure may include, for example, a roof, hood, trunk, one or more doors (e.g., hinged passenger door, sliding door, pocket door), hinges, fender, quarter panel, wheel wells, floor pan, occupant compartment, cargo bed, tailgate, windows, window seals, trim, dash components, electronics, lights, accessories, any other suitable components, or any combination thereof. In some embodiments, a body structure need not include body panels (e.g., as illustrated at least partially in panel 153), and may include no body panels, some body panels, or all body panels (e.g., doors, fenders, roof, hood, cargo bed floor, or any other exterior panel). For example, body panels may be added to a body structure before or after the body structure is fastened to a frame structure.

Step 104 includes processing the body structure. Step 104 may include, for example, fastening, welding, sanding, grinding, applying primer, painting, coating (e.g., powder coating), applying adhesive, applying an electrocoating (e.g., an e-coating for corrosion resistance), any other suitable processing, or any combination thereof. In some embodiments, the region for interfacing to a frame system is processed to provide a more suitable surface (e.g., for fastening, adhering, or both).

Step 106 includes assembling a frame structure. To illustrate, panel 151 shows an illustrative frame system, in accordance with some embodiments of the present disclosure. A frame system may include, for example, suspension components, steering components, braking components, wheels, battery modules, power electronics (e.g., motor drives), drivetrain components (e.g., electric motors, gearboxes, half-shafts, axles, couplers), control systems, any other suitable components, or any combination thereof. In some embodiments, the frame system includes a rolling chassis having wheels, suspension, steering, and braking systems in place. In some embodiments, the frame system includes a battery system and electric drivetrain for an electric vehicle.

Step 108 includes processing the frame structure. Step 108 may include, for example, fastening, welding, sanding, grinding, applying primer, painting, coating (e.g., powder coating), applying adhesive, applying an electrocoating (e.g., an e-coating for corrosion resistance), aligning, tuning, any other suitable processing, or any combination thereof. In some embodiments, the region for interfacing to a body system is processed to provide a more suitable surface (e.g., for fastening, adhering, or both).

Step 110 includes applying an adhesive to an interface of the body structure and the frame structure. To illustrate, panel 152 shows an illustrative adhesive arrangement, in accordance with some embodiments of the present disclosure. In panel 152, the adhesive arrangement is shown by the lines, while fastener locations are indicated by dots (e.g., which may represent holes configured to accommodate fasteners, threaded studs, threads, nuts, clips, clamps, or any other suitable components).

Step 112 includes arranging the body structure and the frame structure. To illustrate, panel 153 shows an illustrative body system and frame system being arranged, in accordance with some embodiments of the present disclosure. In some embodiments, step 112 includes positioning the body system, frame system, or both in the lateral plane (e.g., parallel to the ground when the vehicle is siting flat in a normal driving configuration) relative to each other. For example, the body system may be positioned laterally relative to the frame system, which may be secured (e.g., to the manufacturing room floor, a stage, an assembly line) in place. In a further example, both the body system and the frame system may be positioned laterally. In some embodiments, step 112 includes positioning the body system, the frame system, or both vertically (e.g., normal to the ground when the vehicle is siting flat in a normal driving configuration) relative to each other. For example, the body system may be lowered onto the frame system, which may be secured. In some embodiments, the body system, frame system, or both are positioned laterally and vertically. For example, a body system may be first positioned laterally over a frame system and then lowered vertically onto the frame system. In some embodiments, step 112 may be performed by an automated system, which may include, for example, a control system, one or more actuators (e.g., a 3-axis actuator system), position sensors (e.g., encoders, optical sensors, image-based sensors), any other suitable components, or any combination thereof. In some embodiments, step 112 may be performed under manual control using, for example, a crane system, a rail system, any other suitable mechanisms, or any combination thereof.

To illustrate, panel 153 shows a body system arranged above a frame system. For example, a pattern of adhesive may be applied to either the underside of the body system the top side of the frame system, or both, at the intended interface, prior to lowering the body system onto the frame system. In a further example, one or more electrical connections, mechanical connections, conduit connections, or a combination thereof may be made during arrangement of the body system, frame system, or both.

Step 114 includes fastening the body structure and the frame structure. In some embodiments, step 114 includes applying more than twenty (20) fasteners between the body system and the frame system. In some embodiments, step 114 includes applying more than fifty (50) fasteners between the body system and the frame system. In some embodiments, step 114 includes applying more than seventy (70) fasteners between the body system and the frame system. In an illustrative example, step 114 may include installing seventy-six (76) heavy duty bolts (e.g., optionally of varying sizes and strengths) across the interface between the body system and the frame system.

To illustrate, panel 152 indicates adhesive patterns and hard-mount locations (e.g., via fasteners). Step 114 may include installing a plurality of fasteners, each at a hard-mount location, after the body system and frame system are arranged at step 112 (e.g., and adhesive is applied at step 110). In some embodiments, step 114 is performed after the arrangement of step 112, as a separate action. In some embodiments, step 112 and 114 may be combined. For example, the interface between the body system and the frame system may include clamps, clips, fasteners, or other components that lock in place during arrangement such that a separate fastening action is not required. To illustrate, components at the interface may be spring loaded (e.g., by a spring or elastic deformation), plastically deformed, cinched, or otherwise engaged during arrangement.

In illustrative examples of process 100, when the frame and body assemblies are completed in the body shop (e.g., on separate production lines), the assemblies are then taken through the e-coat process (e.g., at steps 104 and 108). In some embodiments, at step 104, the body system may be provided to a paint line to receive priming, painting, clear-coat, any other suitable coating, or any combination thereof. In some embodiments, after painting, brake components, electrical components (e.g. an electrical harness or other wires), interior components, HVAC components, hydraulic lines, and any other suitable components are installed on the body system. In some embodiments, at step 108, the frame system is provided to a dressing line where powertrain components, a battery system, and suspension components are installed. Once processed (e.g., steps 102, 104, 106, and 108), the body system and frame system are brought together to be joined permanently, at steps 110-114. For example, steps 110-114 may occur along a general assembly line. In some embodiments, steps 114 includes installing a plurality of fasteners at the interface between the body system and the frame system along the length and width of the vehicle, along with the use of structural grade adhesive (e.g., Loctite HH A8000, any other suitable adhesive, or any combination thereof). In some embodiments, the placement of the adhesive, fasteners, or both are determined using virtual analysis in view of collision performance, noise-vibration-harshness (NVH), durability, any other requirements or considerations, or a combination thereof safety.

In some embodiments, when the adhesive of step 110 cures, the joints are permanently set at the interface, thus resulting in the body-frame assembly. To illustrate, the hard-mounted (e.g., permanently fixed) nature of the joint at the interface allows the vehicle to have continuous, integrated load paths to better distribute energy and loads across the vehicle. Further, the body system and the frame system work together in concert to contribute to vehicle rigidity and structural integrity. Improved rigidity and structural integrity may allow for improved ride and handling characteristics. Further, the distributed load path formed by the adhesive and fasteners (e.g., of steps 110-114) help ensure that no one portion/region of the interface is overburdened or overstressed, which in turn may help achieve a high design efficiency and improved weight savings.

In some embodiments, the illustrative steps of process 100 allow for various body systems and frame systems to be joined, using the same or altered mounting patterns (e.g., fastener pattern, adhesive pattern, or both). For example, a body system may be selected from among one or more body styles for installation with a given frame system (e.g., which may be selected from a plurality of frame systems). In a further example, a frame system may be selected from among one or more frame styles for installation with a given body system (e.g., which may be selected from a plurality of body systems). In some embodiments, different combinations of body systems and frame systems may be joined using the same or different arrangements of fasteners and adhesive. Accordingly, in some embodiments, a particular pattern of adhesives and fasteners may be used across a plurality of body-frame combinations. Further, in some embodiments, a particular pattern of adhesive and respective patterns of fasteners may be used across a plurality of body-frame combinations. Further, in some embodiments, respective patterns of adhesive and a particular pattern of fasteners may be used across a plurality of body-frame combinations. In some embodiments, the techniques of the present disclosure allow body-frame assemblies that do not require re-engineering of the platform for a different model of vehicle.

Figure 2:
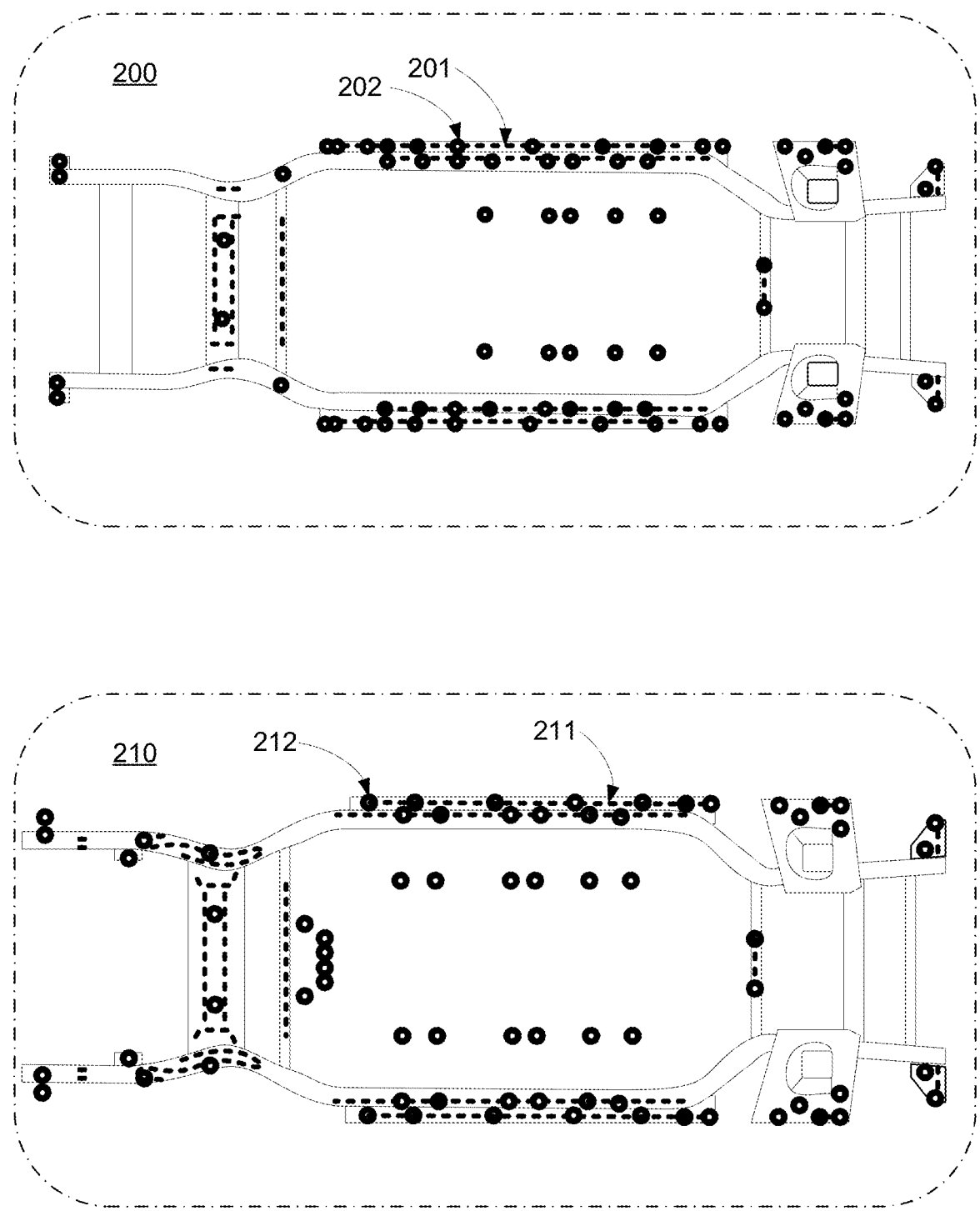
FIG. 2 shows a diagram of several illustrative adhesive and fastening layouts for a vehicle, in accordance with some embodiments of the present disclosure.

FIG. 2 shows a diagram of several illustrative adhesive and fastening layouts for a vehicle, in accordance with some embodiments of the present disclosure. Layouts 200 and 210 illustrative arrangements of adhesive and hard-mount locations, in accordance with some embodiments of the present disclosure. Respective vehicle frames are illustrated in layouts 200 (e.g., a truck) and 210 (e.g., a passenger vehicle) for context. The frames include frame members and shock towers as illustrated (e.g., the front of the frame is arranged to the right hand side of FIG. 2). As illustrated by layout 200, adhesive path 201 (e.g., indicated by dotted lines in FIG. 2) is arranged to substantially follow the plurality of hard-mount locations 202 (e.g., a fastener arrangement, indicated by circles in FIG. 2). As illustrated by layout 210, adhesive path 211 is arranged to substantially follow the plurality of hard-mount locations 212 (e.g., a fastener arrangement). In some embodiments, hard-mount locations are configured to accommodate a plurality of fasteners. For example, the plurality of fasteners and the adhesive form a joint mechanically stiffer than either the body structure or the frame structure alone. In some embodiments, the hard-mount locations (e.g., to accommodate a plurality of fasteners) are arranged to have a spacing that is configured to distribute a transfer of load between the body structure and the frame structure. To illustrate, a plurality of fasteners may extend between wheel wells of the vehicle. To further illustrate, the plurality of fasteners may extend to strut towers of the vehicle. In some embodiments, an adhesive path (e.g., adhesive path 211) and fastener patterns (e.g., hard-mount locations 212) are determined based at least in part on vehicle functionality and manufacturing requirements. In some embodiments, an adhesive that cures at room temperature is selected such that the joint formed by the adhesive hardens over time without the need of further processing (e.g., without need for elevated temperature, a chemical activator, or ultra-violet irradiation). In some embodiments, the plurality of fasteners may include fasteners of various sizes arranged throughout the vehicle to accommodate a design environment and achieve the desired joint strength.

Figure 3:
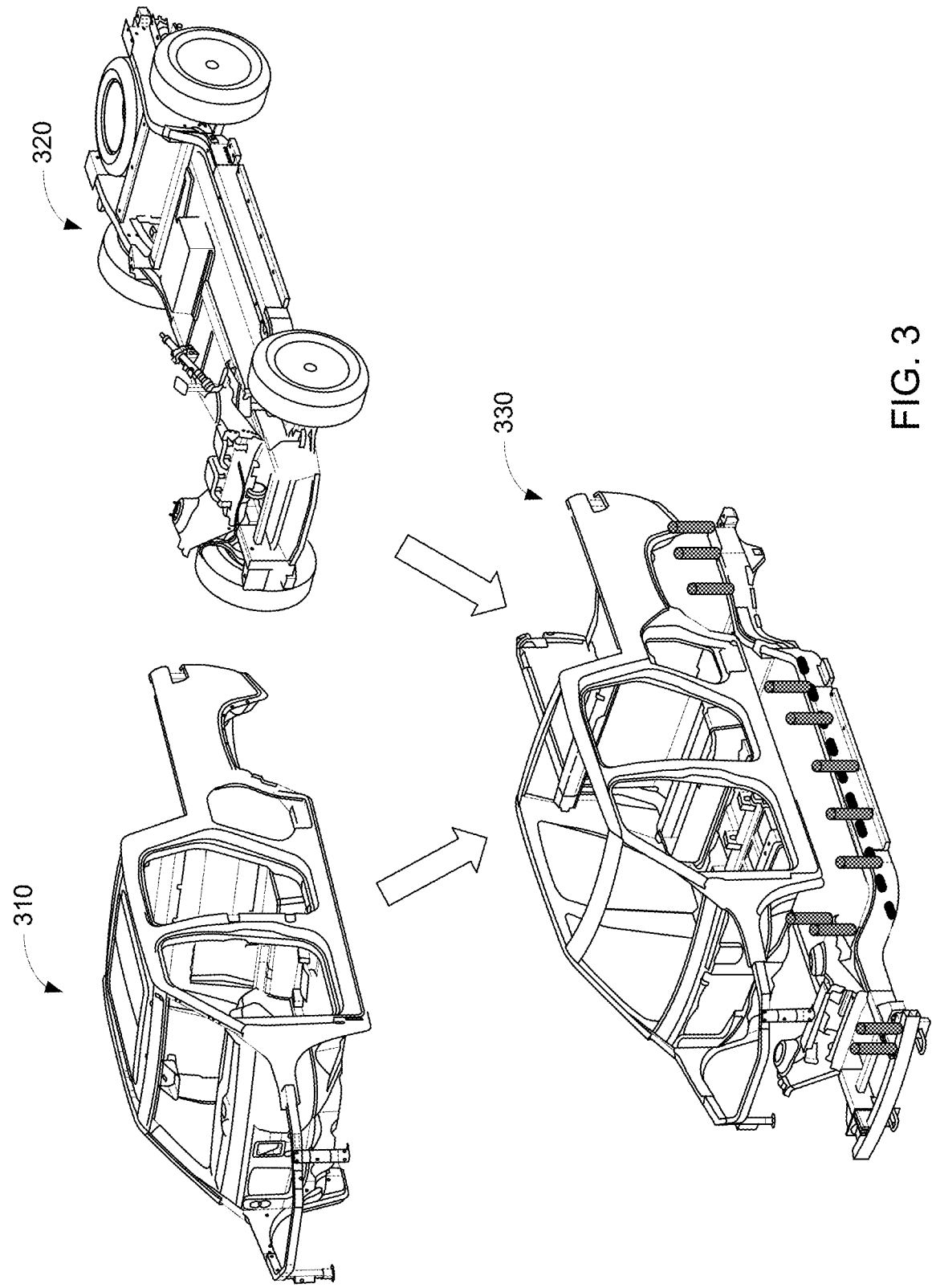
FIG. 3 shows perspective views of a body system and a frame system being arranged for affixing, in accordance with some embodiments of the present disclosure.

FIG. 3 shows perspective views of body system 310 and frame system 320 being arranged for affixing, in accordance with some embodiments of the present disclosure. Arrangement 330 includes body system 310 and frame system 320 positioned laterally, but still spaced vertically (e.g., body system 310 is ready to be lowered onto frame system 320). Some fasteners 332 and adhesive 331 are illustrated in FIG. 3, although the vehicle includes more fasteners and adhesive along the interface than illustrated in FIG. 3.

Body system 310, as illustrated, includes a truck body having an occupant compartment (e.g., a cab), a storage compartment, a cargo bed, a hood structure (e.g., the hood is not installed), a roof, a firewall, door pillars (e.g., A-pillar, B-pillar, and C-pillar illustrated), floor panel, mounting hardware, and other components.

Frame system 320, as illustrated, includes a battery pack, a battery control system (e.g., that may include power electronics, motor drives), frame members, drivetrain components (e.g., that may include electric motors, gearboxes, axles, half-shafts), a suspension system (e.g., that may include struts, shocks, ball joints, control arms, springs, dampers, sway bars), a braking system, a steering system (e.g., that may include steering knuckles, linkages, a motor, a gearbox), sensors, wiring (e.g., that may include wiring harnesses and connectors), wheels, a spare wheel, any other components.

In some embodiments, body system 310 is assembled and processed during separate processing steps used to assembly and process frame system 320. For example, body system 310 may be created along a first assembly line, and frame system 320 may be created along a second assembly line.

In an illustrative example, frame system 320 and body system 310 each includes a plurality of holes, each configured to accommodate a threaded fastener (e.g., a bolt). Corresponding fasteners may be inserted through each hole of frame system 320, and a corresponding hole of body system 310, and engaged with a fastener having a mating thread (e.g., a threaded nut). In some embodiments, studs may be included on the frame system, body system or both and may be welded or otherwise affixed in place. For example, a plurality of threaded studs may be affixed to frame system 320, and body system 310 may include a plurality of holes that correspond to the plurality of studs. As body system 310 is lowered onto frame system 320, the fasteners pass-through the corresponding holes and engage mating fasteners.

In a further illustrative example, an adhesive may be arranged at the interface between body system 310 and frame system 320, on either or both systems. For example, in some embodiments, the adhesive may be applied to a portion of the interface that is flat (e.g., for better adhesion). Further, that portion of the interface may be sanded, ground, polished, cleaned, chemically treated, or otherwise prepared for application of adhesive. In some embodiments, the adhesive is applied along a path of fasteners, with the fasteners providing a clamping force as the adhesive cures (e.g., and continuing afterwards). Engaging the plurality of fasteners secures the body system against the frame system and imparts a rigidity to the joint, provides a stiffness against deformation, and allows transfer of forces and stresses across the interface (e.g., shear stresses, normal stresses, tensile stresses, compressive stresses, cyclic stresses, impact stresses). Because the hard-mounts (e.g., the fasteners) are arranged at discrete points, the stresses may tend to concentrate at these points, thus more likely causing local deformation or failure. The adhesive helps to distribute the stress transfer more evenly, by transferring the stresses along a path (e.g., have an interface area) rather than discrete points (e.g., having less interface area). Thus the combination of the fasteners and adhesive provides a strong affixment without being as likely to exhibit large local stresses. In some embodiments, the assembly of body system 310 and frame system 320 using fasteners and adhesive allows the resulting structure to be relatively stronger against a given load than either system individually.

The interface between body system 310 and frame system 320, when affixed by fasteners and adhesive, is not compliant such as a body bushing or other damping and deformable coupling. The affixed interface between body system 310 and frame system 320 is stiff and relatively non-damped.

Figure 4:
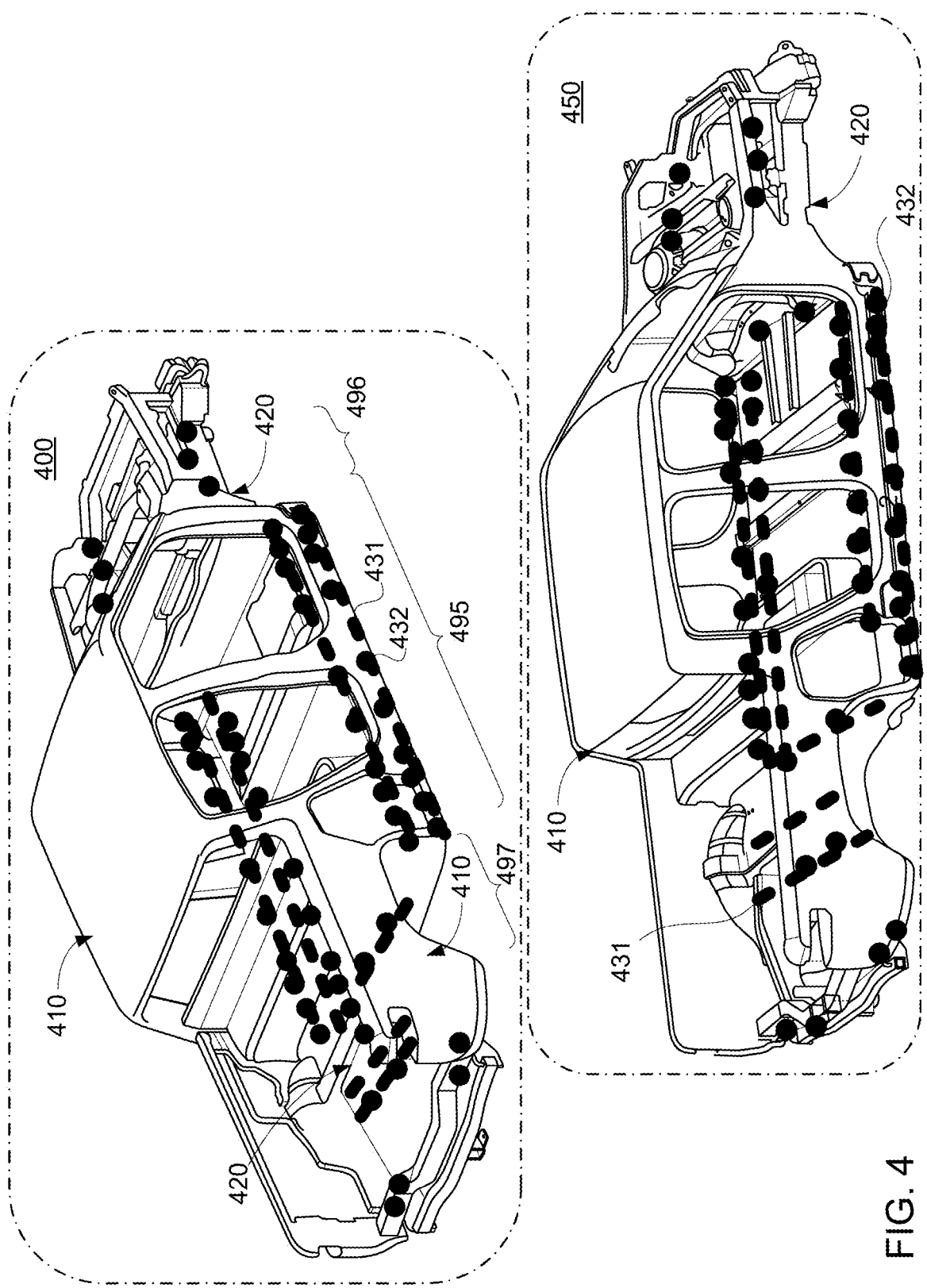
FIG. 4 shows two perspective views of an assembly including a body system with adhesive and fastener arrangements marked, in accordance with some embodiments of the present disclosure.
Figure 5:
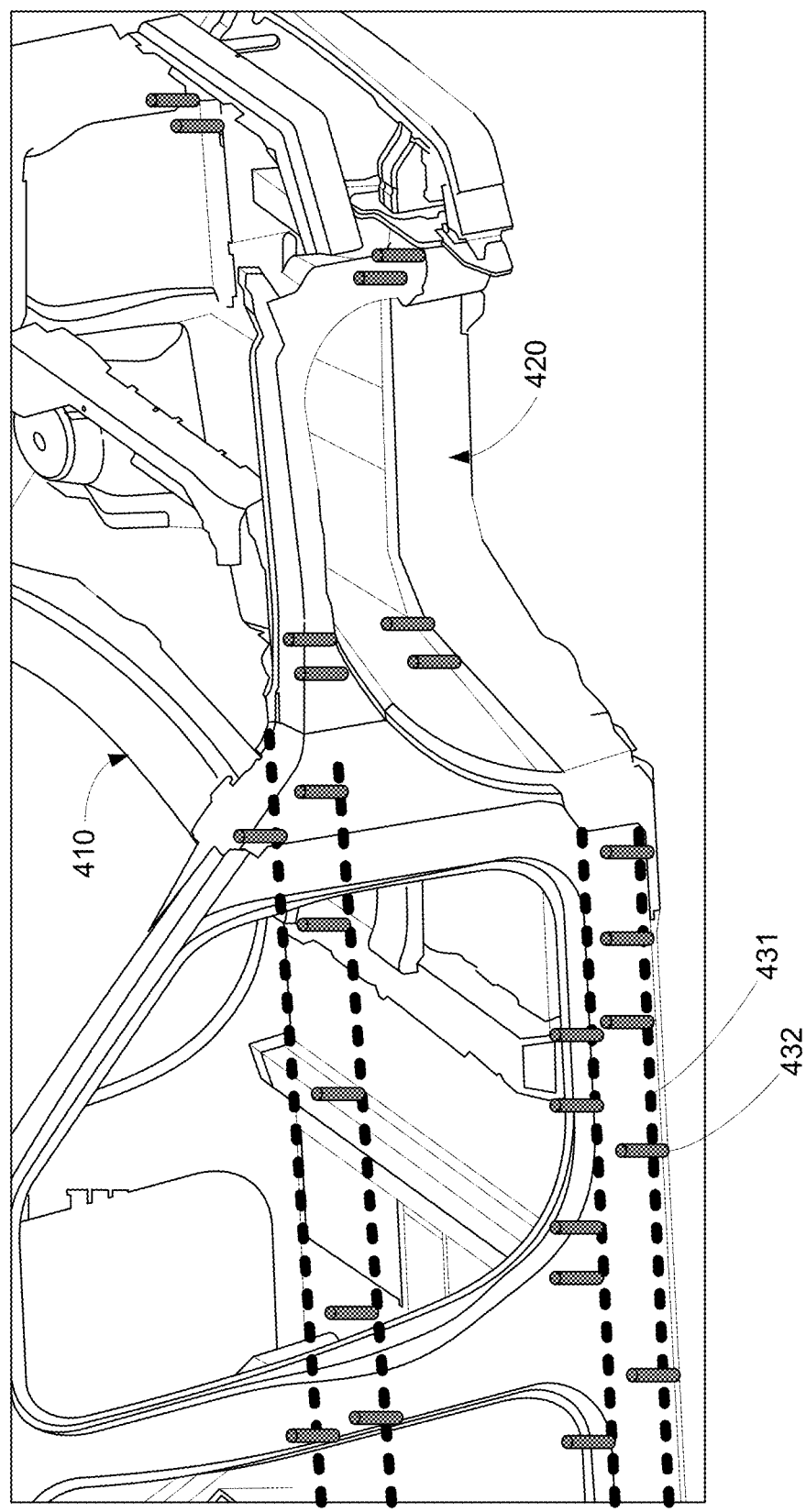
FIG. 5 shows an enlarged perspective view, from above on the right (e.g., passenger) side, of a portion of the assembly of FIG. 4, in accordance with some embodiments of the present disclosure.

FIG. 4 shows two perspective views of an assembly including body system 410 and a portion of frame system 420 with adhesive arrangement 431 and fastener arrangement 432 marked, in accordance with some embodiments of the present disclosure. Panels 400 and 450 show views of body system 410 from different vantage points for illustrative purposes. FIG. 5 shows an enlarged perspective view, from above on the right (e.g., passenger) side, of a portion of the assembly of FIG. 4, in accordance with some embodiments of the present disclosure.

The underside of body system 410 is configured to be affixed by fastener arrangement 432 and adhesive arrangement 431 to frame system 420. It will be understood that frame system 420 may include any suitable components, and is shown as a simplified assembly in FIG. 4 for illustration purposes. For example, frame system 420 may include a battery pack, a battery control system, frame members, drivetrain components, a suspension system, a braking system, a steering system, sensors, wiring, wheels, a spare wheel, any other suitable components, or any combination thereof. In a further example, frame system 420 may be similar to frame system 320 of FIG. 3, with some components not illustrated for purposes of clarity.

As illustrated in FIG. 4, fastener arrangement 432 includes fasteners along the sides of the interface between body system 410 and frame system 420 (e.g., side 495 illustrated between front wheel well 496 and rear wheel well 497), forming two longitudinal paths on each side. Further, fastener arrangement 432 includes fasteners arranged at the front and rear portions of body system 410 (e.g., in front of the front wheel 496 well and behind the rear wheel well 497). Adhesive arrangement 431 approximately follows fastener arrangement 432 along the interface between body system 410 and frame system 420.

Figure 6:
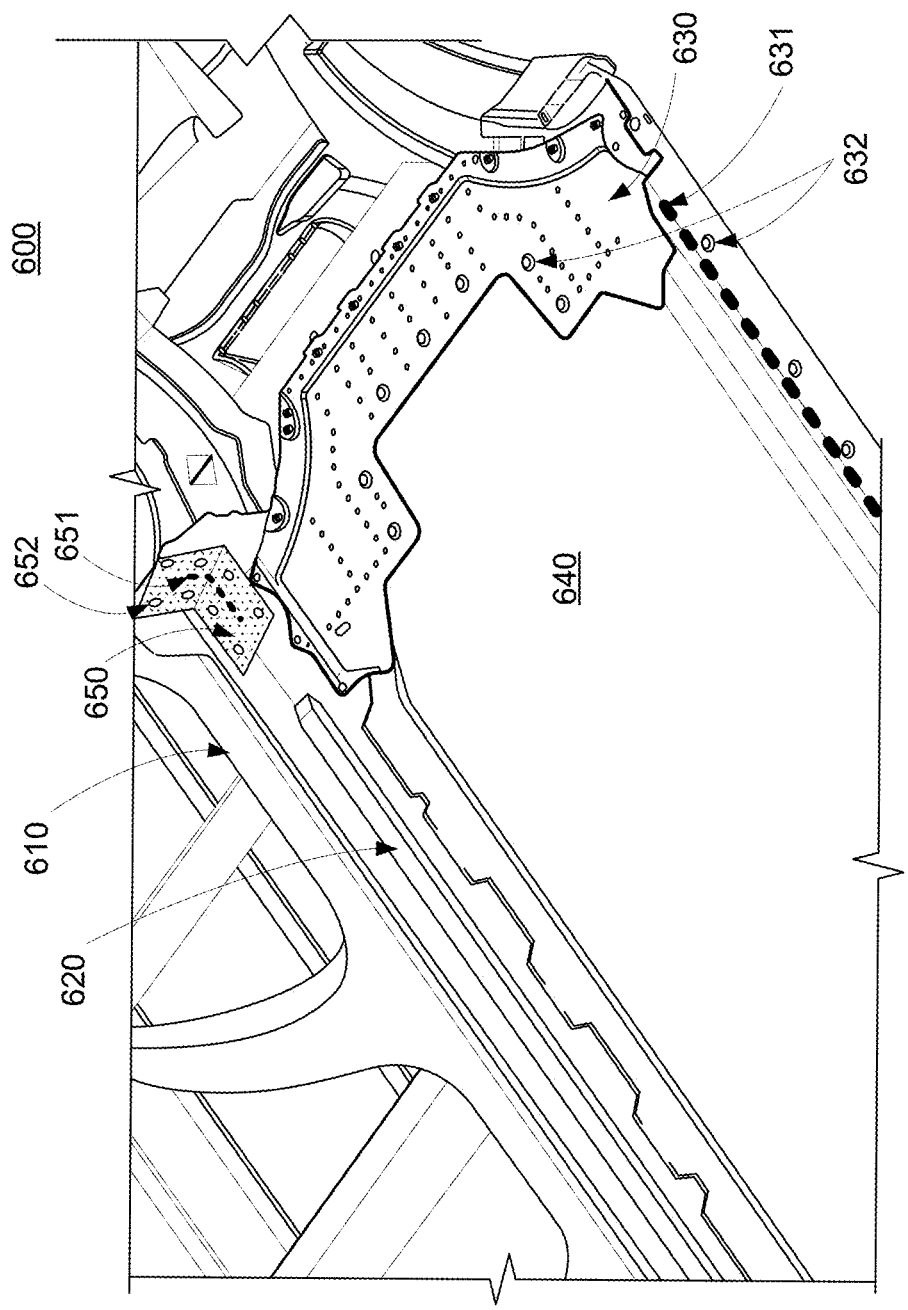
FIG. 6 shows a perspective view, from below, of a portion of a vehicle with a structural components installed, in accordance with some embodiments of the present disclosure.

FIG. 6 shows a perspective view, from below, of a portion of vehicle 600 (e.g., the underside of vehicle 600) with structural components 630 and 650 installed, in accordance with some embodiments of the present disclosure. As illustrated, vehicle 600 includes body system 610, frame system 620 (e.g., which includes battery system 640), adhesive arrangement 631, and fastener arrangement 632.

Structural component 630, as illustrated, is positioned behind the front wheel wells and includes a plate connected to both body system 610 and frame system 620. Structural component 630 provides structural support such as, for example, providing lateral stiffness (e.g., for lateral loading). In some embodiments, structural component 630 is affixed to body system 610 and frame system 620 by an adhesive arrangement, an arrangement of hard-mounts, or both. For example, in some embodiments, adhesive arrangement 631 and fastener arrangement 632 include corresponding portions for affixing structural component 630. In some embodiments, one or more structural components may be installed as part of a vehicle to assist or otherwise modify the transfer of load between a body system and a frame system. To illustrate, some fasteners of fastener arrangement 632 are arranged along the body-frame interface, and some fasteners extend through structural component 630 to couple to body system 610, frame system 620, or both. Structural component 650, as illustrated, is positioned at the lower, rear portion of the front wheel well. Structural component 650 includes a substantially right angle bend, and extends from under frame system 620 to the rear face of a front wheel well of body system 610. Structural component 650 is affixed to body system 610 and frame system 620 by fastener arrangement 652 and adhesive arrangement 651. In some embodiments, fastener arrangement 652 and adhesive arrangement 651 may be included as part of fastener arrangement 632 and adhesive arrangement 631, respectively.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A vehicle comprising:
    a body structure comprising an occupant compartment;
    a frame structure comprising a chassis and forming an interface with the body structure;
    a plurality of fasteners affixing the body structure to the frame structure, wherein a subset of the plurality of fasteners extend longitudinally along a side of the interface between a front wheel well and a rear wheel well of the vehicle; and
    an adhesive arranged at one or more positions affixing the body structure to the frame structure, wherein the one or more positions comprise a position along the side; and a component affixed to the body structure and the frame structure, using one or more of the adhesive and fasteners to provide structural support.

2. The vehicle of claim 1, wherein the plurality of fasteners comprises at least fifty (50) fasteners.

3. The vehicle of claim 1, wherein the plurality of fasteners comprises at least twenty (20) fasteners.

4. The vehicle of claim 1, wherein the one or more positions comprise a path arranged to follow a subset of the plurality of fasteners.

5. The vehicle of claim 1, wherein the plurality of fasteners and the adhesive form a joint mechanically stiffer than either the body structure or the frame structure alone.

6. The vehicle of claim 1, wherein the plurality of fasteners are arranged having a spacing configured to distribute a transfer of load between the body structure and the frame structure.

7. The vehicle of claim 1, wherein the plurality of fasteners includes fasteners that extend forward or rearward of strut towers of the vehicle.

8. The vehicle of claim 1, wherein a second subset of the plurality of fasteners extend longitudinally in front of a front wheel well of the vehicle, and wherein another a third subset of the plurality of fasteners extend longitudinally behind a rear wheel well of the vehicle.

9. The vehicle of claim 1, wherein the component comprises a plate fastened to an underside of the vehicle to provide lateral stiffness.

10. The vehicle of claim 1, wherein the frame structure further comprises:
   a battery pack arranged underneath the body structure;
   a suspension system; and
   a powertrain system electrically coupled to the battery pack.

11. The vehicle of claim 1, wherein the body structure further comprises:
   a floor pan; and
   one or more door pillars.

12. A method of assembling a vehicle, the method comprising:
   providing a body structure comprising an occupant compartment;
   providing a frame structure, comprising a chassis;
   applying a plurality of fasteners to affix the body structure to the frame structure along an interface, wherein a subset of the plurality of fasteners extend longitudinally along a side of the interface between a front wheel well and a rear wheel well of the vehicle;
   applying an adhesive along a path affixing the body structure to the frame structure, wherein the one or more positions comprise a position along the side; and
   arranging the body structure against the frame structure to form a mechanical joint at the interface; and a component affixed to the body structure and the frame structure, using one or more of the adhesive and fasteners to provide structural support.

13. The method of claim 12, wherein the plurality of fasteners comprises at least fifty (50) fasteners.

14. The method of claim 12, wherein the plurality of fasteners comprises at least twenty (20) fasteners.

15. The method of claim 12, wherein the plurality of fasteners and the adhesive form a joint mechanically stiffer than either the body structure or the frame structure alone.

16. The method of claim 12, wherein the plurality of fasteners include fasteners that extend forward or rearward of strut towers of the vehicle.

17. The method of claim 12, wherein a second subset of the plurality of fasteners extend longitudinally in front of a front wheel well of the vehicle, and wherein a third subset of the plurality of fasteners extend longitudinally behind a rear wheel well of the vehicle.

18. The method of claim 12, wherein the component comprises a plate, and wherein affixing the plate comprises fastening the plate to an underside of the vehicle to provide lateral stiffness.

* * * * *

UNITED STATES PATENT AND TRADEMARK OFFICE
CERTIFICATE OF CORRECTION

| | |
|---|---|
| PATENT NO. | : 11,584,448 B2 |
| APPLICATION NO. | : 17/096454 |
| DATED | : February 21, 2023 |
| INVENTOR(S) | : Chauhan et al. |

It is certified that error appears in the above-identified patent and that said Letters Patent is hereby corrected as shown below:

In the Claims

In Claim 8, at Column 9, Line 20, please delete "another."

Signed and Sealed this
Eleventh Day of April, 2023

*Katherine Kelly Vidal*

Katherine Kelly Vidal
*Director of the United States Patent and Trademark Office*